United States Patent
Konishi et al.

(10) Patent No.: US 7,213,695 B2
(45) Date of Patent: May 8, 2007

(54) ELECTROMAGNETIC CLUTCH

(75) Inventors: Toshihiro Konishi, Kariya (JP);
Toshihiro Hayashi, Chiryu (JP)

(73) Assignee: Denso Corporation, Kariya (JP)

( * ) Notice: Subject to any disclaimer, the term of this patent is extended or adjusted under 35 U.S.C. 154(b) by 157 days.

(21) Appl. No.: 11/057,781

(22) Filed: Feb. 15, 2005

(65) Prior Publication Data

US 2005/0183923 A1    Aug. 25, 2005

(30) Foreign Application Priority Data

Feb. 20, 2004  (JP) .............................. 2004-044746

(51) Int. Cl.
*F16D 27/112*    (2006.01)

(52) U.S. Cl. .............................. 192/84.941; 192/84.961

(58) Field of Classification Search ............ 192/84.941
See application file for complete search history.

(56) References Cited

U.S. PATENT DOCUMENTS

| 5,642,798 | A |   | 7/1997 | Muirhead et al. |
| 5,944,158 | A | * | 8/1999 | Okazaki ................... 192/84.96 |
| 6,194,803 | B1 | * | 2/2001 | Heim et al. ............ 192/84.941 |
| 6,209,699 | B1 |   | 4/2001 | Hayashi et al. |

FOREIGN PATENT DOCUMENTS

| FR | 2818340 A |   | 6/2002 |
| FR | 2853029 A |   | 10/2004 |
| JP | 55-123028 A | * | 9/1980 |
| JP | A-2000-161389 |   | 6/2000 |
| JP | A-2002-48155 |   | 2/2002 |

OTHER PUBLICATIONS

Office Communication issued from French Patent Office issued on Oct. 26, 2005 for the corresponding French patent application No. (a copy thereof).

* cited by examiner

*Primary Examiner*—Rodney H. Bonck
(74) *Attorney, Agent, or Firm*—Posz Law Group, PLC

(57) ABSTRACT

An electromagnetic clutch 1 has a construction in which an armature 5 and a plate 7 sandwich an elastic member 9 between them. A spring portion 7d is formed in the plate 7 and an elastic member 9a is so disposed as to cover a front side of the spring portion 7d, too. Elastic members 9b, 9c and 9d are disposed in a thin film form on an inner surface of elongated holes 5a of the armature 5 and the innermost and outermost diameter portions 5b and 5c of the armature 5. The distal end of each elastic member 9b, 9c and 9d is extended to the same plane as an end face 5d of the armature 5 on the rear side or to a position somewhat protruding from the end face on the rear side.

9 Claims, 6 Drawing Sheets

FRONT SIDE ◀──────▶ REAR SIDE

FRONT SIDE ⟵⟶ REAR SIDE

FRONT SIDE ←——→ REAR SIDE

FRONT SIDE ←————→ REAR SIDE

ELECTROMAGNETIC CLUTCH

BACKGROUND OF THE INVENTION

1. Field of the Invention

This invention relates to an electromagnetic clutch for transmitting and cutting-off turning power. The invention is suitable for connecting and cutting-off a compressor operation, for a car air conditioner, for example.

2. Description of the Related Art

An electromagnetic clutch for a compressor of a car air conditioner according to the prior art includes a rotor driven and rotated by a driving source such as an engine and an armature so disposed as to face the rotor with a predetermined small clearance between them. A hub structure of a leaf spring type is known as one of the hub structures for interconnecting the armature to a rotary shaft on the compressor side. In this hub structure, one of the ends of a leaf spring is interconnected to an inner hub that is in turn interconnected to the rotary shaft on the compressor side and the other end of the leaf spring is interconnected to the armature.

Because the hub structure of the leaf spring type can use an economical iron type material as a leaf spring material and can also use simple interconnecting means such as rivet coupling for the interconnecting portion of the leaf spring, this hub structure has the advantages that the manufacturing cost can be reduced and the size of the electromagnetic clutch in an axial direction can be reduced. However, it is known that, because the power transmission system from the armature to the hub does not have a damping mechanism of vibration (impact) and torque fluctuation, the hub structure cannot provide a damping effect regarding a clutch operation sound and torsional resonance.

In the construction of the existing electromagnetic clutches, frictional surfaces, of the armature and the rotor and that are made of iron, directly impinge against each other. Therefore, there remain the problems that the transmission torque increases with the increase of the number of times of connection/disconnection from the relation of compatibility of the materials besides the occurrence of the operation sound, and the initial transmission torque is lower than the transmission torque after connection/disconnection.

Another problem is that surface treatment is necessary because the raw material of both plate (leaf spring) and armature is iron.

To cope with the problems, Japanese Unexamined Patent Publication No. 2000-161389 as a prior art reference reduces the operation sound by directly interconnecting the leaf spring member (plate) and the armature through an elastic member made of rubber.

According to this prior art technology, too, the problem yet remains unsolved that the surface treatment is necessary because the leaf spring member (plate) is exposed. Another problem is that reaction becomes high and an operation factor is deteriorated because the spring portion of the leaf spring member is bonded to the elastic member.

Furthermore, the problem of the impingement sound that occurs when electric power is fed to the electromagnetic coil and the armature is attracted to the rotor is not solved, either, because the armature is so disposed as to face the rotor with a clearance between them. Further, the problem also remains that when the armature is operated, the leaf spring member vibrates and noise occurs.

SUMMARY OF THE INVENTION

In view of the problems described above, the invention is directed to provide an electromagnetic clutch that can reduce the operation sound, can increase the initial torque, can suppress the increase of the reaction of the spring portion of the plate and can eliminate the necessity for the surface treatment of the plate and the armature.

According to the present invention, there is provided an electromagnetic clutch of the type in which an armature and a plate sandwich an elastic member between them, a spring portion is formed on the plate and the elastic member is so disposed as to cover a front side of the spring portion, too. Consequently, vibration of the spring portion of the plate when the armature is attracted to a driving side rotary member (rotor) can be damped and the attraction sound can be reduced.

In the electromagnetic clutch according to the present invention, the elastic member covers, as a whole, the front side of the plate. Accordingly, the attraction sound can be reduced and a surface treatment step of the plate such as rust-proofing can be completely eliminated.

In the electromagnetic clutch according to the present invention, an inner peripheral edge portion of each of a plurality of apertures bored in the plate is positioned inside an inner diameter of the armature. Consequently, the portion corresponding to the gap between the inside of the aperture of the plate and the adjacent aperture is the spring portion of the plate.

In the electromagnetic clutch according to the present invention, an outer peripheral edge portion of each aperture is positioned more outward in a radial direction than an inner diameter of the armature. Consequently, the portion corresponding to the gap between the apertures of the plate causes elastic deformation of the elastic member sandwiched between the armature and the plate and the spring portion of the plate can smoothly undergo deflection with the result that the attraction sound can be reduced.

In the electromagnetic clutch according to the present invention, the elastic member is extended at least to the same plane as an end face of the armature on the rear side or to a position somewhat protruding from the end face of the armature on the rear side. Consequently, the initial transmission torque of the electromagnetic clutch can be increased and the attraction sound between the armature and the driving side rotary member (rotor) can be reduced.

In the electromagnetic clutch according to the present invention, the elastic member is extended from an elongated hole formed in the armature to the rear side of the armature. Consequently, the same function and effect as described above can be acquired.

In the electromagnetic clutch according to the present invention, the elastic member is extended from at least one position of the outermost or innermost diameter of the armature towards the rear side of the armature. Consequently, the same function and effect as described above can be acquired.

The invention may be more fully understood from the description of preferred embodiments of the invention, as set forth below, together with the accompanying drawings.

DESCRIPTION OF THE PREFERRED EMBODIMENTS

Figure 1:
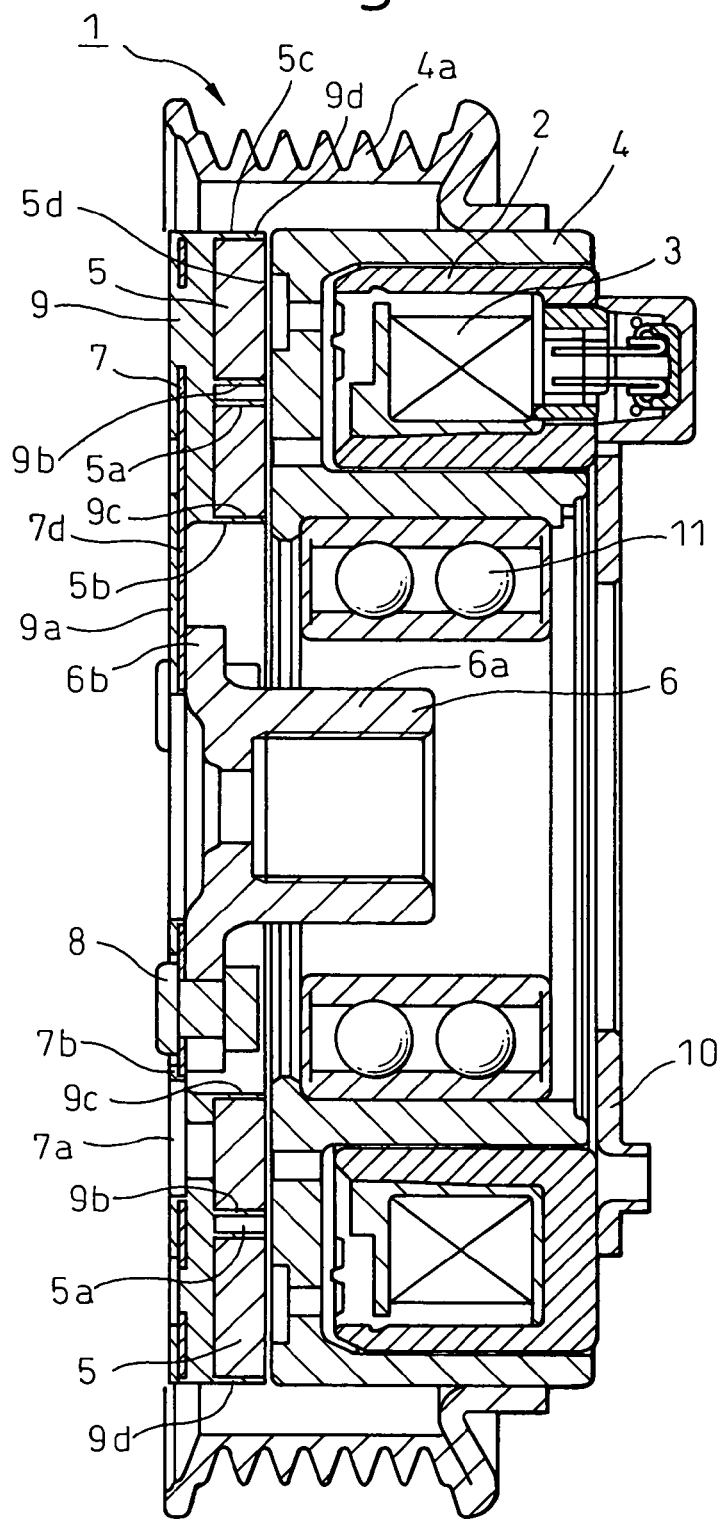
FIG. 1 is a longitudinal sectional view showing an overall construction of an electromagnetic clutch according to an embodiment of the invention.
Figure 2:
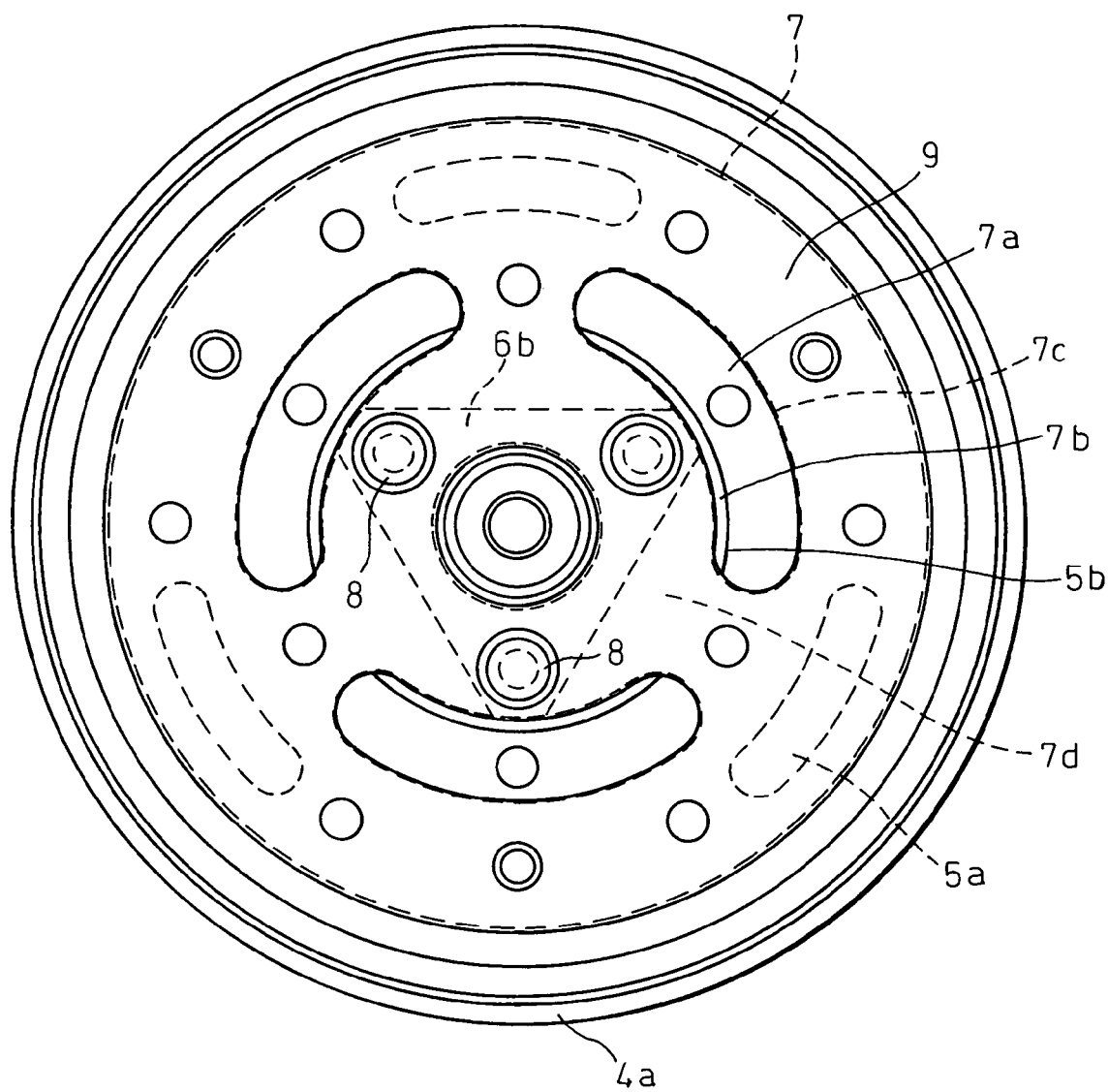
FIG. 2 is a front view showing the electromagnetic clutch according to the embodiment of the invention.

An electromagnetic clutch according to preferred embodiments of the invention will be hereinafter explained with reference to the accompanying drawings. FIG. 1 is a longitudinal sectional view of the electromagnetic clutch according to the invention. This clutch is appropriately fitted to a refrigerant compressor of a refrigeration cycle of an air conditioner for a vehicle. FIG. 2 is a front view of the electromagnetic clutch. The electromagnetic clutch 1 according to the invention includes an electromagnetic coil 3 accommodated in a stator 2, a rotor 4 as a driving side rotary member driven and rotated by a car engine, not shown in the drawing, an armature 5 attracted to the rotor 4 by the magnetic force generated by the electromagnetic coil 3 and an inner hub 6 as a driven side rotary member interconnected to the armature 5 and rotating integrally with the armature 5.

The inner hub 6 is interconnected to a rotary shaft (not shown) of a refrigerant compressor as a driven side apparatus (not shown) and transmits turning power to the refrigerant compressor. The electromagnetic coil 3 is accommodated inside the stator 2 having a square bracket-like sectional shape and formed of a magnetic substance such as iron, and is electrically insulated and mold-fixed inside the stator 2 by an insulating resin member such as an epoxy resin. The stator 2 is fixed to a housing (not shown) of the refrigerant compressor through a ring-like support member 10.

The rotor 4 has a pulley 4a on the outer periphery of which a multi-stage type V belt (not shown) is wound. The rotor 4 is rotated by the turning force of the engine transmitted through the V belt. The rotor 4 is formed of a magnetic substance such as iron and is shaped into a square bracket-like sectional shape for accommodating the stator 2 while keeping a very small clearance. The rotor 4 has a bearing 11 around its inner circumference and this bearing 11 supports the rotor 4 in such a fashion as to be capable of rotating on the outer circumferential surface of a cylindrical boss portion (not shown) of the housing of the refrigerant compressor.

The armature 5 is so disposed as to oppose a friction surface of the rotor 4 with a predetermined small clearance (about 0.5 mm, for example) and is formed of a magnetic substance such as iron into a ring-like shape. A plurality (three in FIG. 2) of elongated holes 5a is formed in the ring-like armature 5 in this embodiment.

The inner hub 6 as the driven side rotary member is formed of an iron type metal into a cylindrical shape. A spline fitting portion 6a is formed on the inner circumferential surface of the cylindrical portion of this inner hub 6. The inner hub 6 is integrally fitted to the rotary shaft of the refrigerant compressor through this spline fitting portion 6a. Fitting flange portions 6b that extend outward in a radial direction from one of the ends of the cylindrical portion of the inner hub 6 in an axial direction are integrally formed at three positions in the circumferential direction. The fitting flange portions 6b equidistantly protrude into a substantially triangular shape when viewed from the front, as shown in FIG. 2.

Portions of the plate 7 as spring member near its inner circumference are interconnected to the three fitting flange portions 6b by three rivets 8, respectively. The plate 7 is formed of an iron type metal spring material and is shaped as a whole into a disc-like shape as shown in FIG. 2. A plurality (three in FIG. 2) of acrcuate elongated holes 7a are punched out at positions of the plate 7 that are positioned more inward in the radial direction than the elongated holes 5a of the armature 5 and are completely deviated from the elongated holes 5a. In this case, the portion corresponding to the gap between the inside of each arcuate elongated hole 7a as the aperture portion and the adjacent arcuate elongated hole 7a is the spring portion 7d of the plate 7 and three spring portions 7d are formed. The elongated hole 7a of the plate 7 as the aperture portion is formed in such a fashion that the inner peripheral edge portion 7b of the arcuate elongated hole 7a is positioned more inward in the radial direction than the innermost diameter portion 5b of the armature 5 and the outer peripheral edge portion 7c of the arcuate elongated hole 7a is positioned more outward in the radial direction than the inner diameter portion 5b of the armature 5. Incidentally, apertures other than the arcuate elongated holes 7a are formed in the plate 7.

The elastic member 9 sandwiched between the armature 5 and the plate 7 is formed of a rubber type elastic material and has a substantially ring-like sheet shape corresponding to the ring shape of the armature 5 as shown in FIGS. 1 and 2. The plate 7 and the armature 5 are bonded simultaneously and integrally by a method such as baking (vulcanization bonding). The elastic member 9 is so disposed as to sandwich the plate 7 integrally formed in this way, is integrally bonded with the armature 5 by vulcanization bonding and is connected to the inner hub 6 by rivets 8, or the like. Therefore, when a current is applied to the electromagnetic coil 3, attraction force develops, the spring portion 7d of the plate 7 undergoes deflection, the armature 5 is attracted to the rotor 4, the armature 5 and the rotor 4 integrally rotate and power is transmitted to the refrigerant compressor, as the apparatus on the driven side, connected to the inner hub 6.

Figure 3:
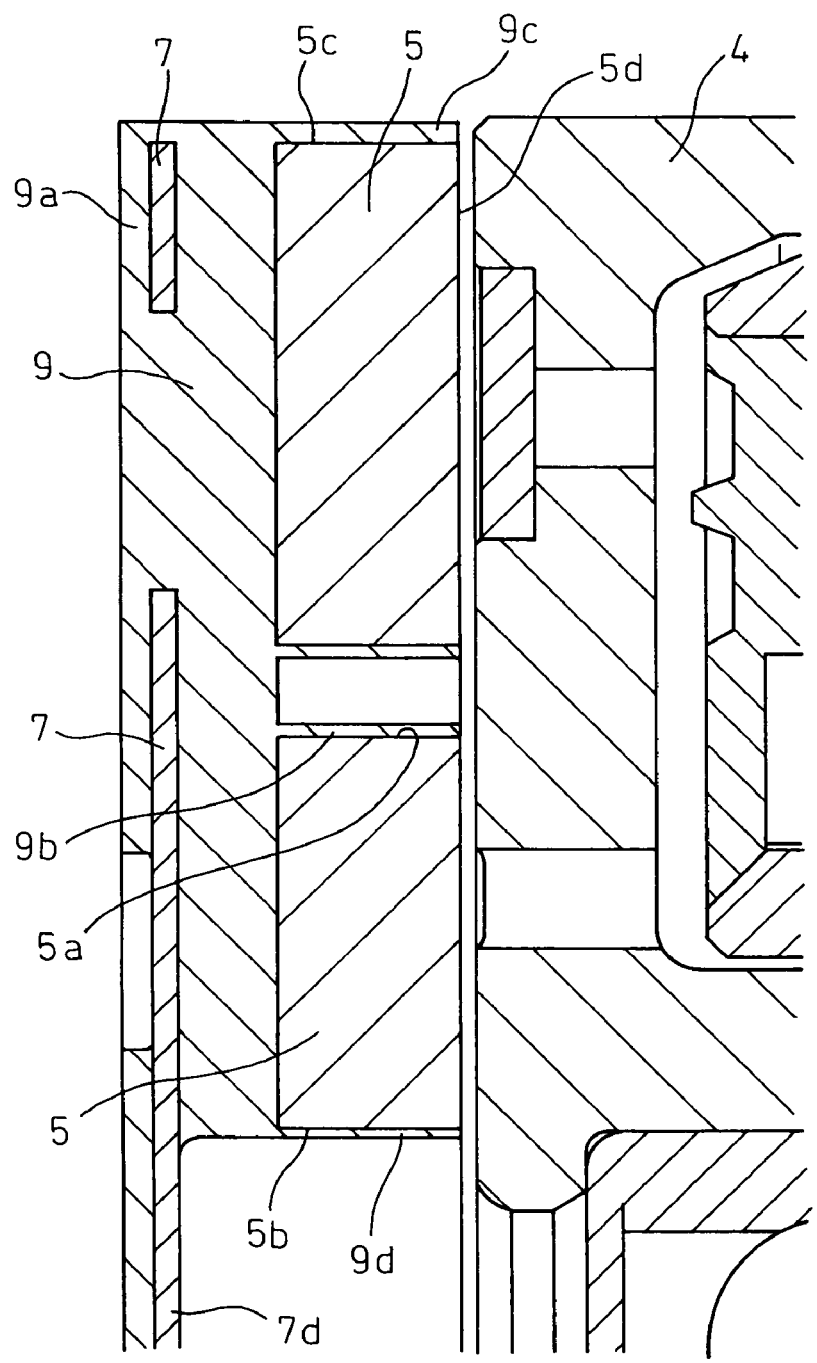
FIG. 3 is a partial enlarged view showing an electromagnetic clutch and is useful for explaining the features of the invention.

Next, the features of the invention will be explained as shown in detail in the enlarge view of FIG. 3. In the invention, the front side of the spring portion 7d of the plate 7 (on the opposite side to the armature 5) is covered with the elastic member 9a, too. Furthermore, this elastic member 9 is exposed to the friction surface on the rear side of the armature 5 by any one of the following methods. In other words, (1) the elastic member 9b is exposed in a thin film form from a plurality of elongated holes 5a formed in the armature 5. In this case, the distal end of the thin film-like elastic member 9b is either extended to the same plane as the end face of the armature 5 on the rear side (the friction surface of the armature 5) or is extended in such a fashion as to somewhat extend from the end face 5d on the rear side. (2) The elastic member 9c is exposed in the thin film form from the outermost diameter portion 5c of the armature 5. In this case, too, the distal end of the thin film-like elastic member 9c is either extended to the same plane as the end face 5d of the armature 5 on the rear side or is extended in such a fashion as to somewhat protrude from the end face 5d on the rear side. (3) The elastic member 9d is extended in the thin film form from the innermost diameter portion 5b of the armature 5. In this case, too, distal end of the thin film-like elastic member 9d is either extended to the same plane as the end face 5d of the armature 5 on the rear side or is extended in such a fashion as to somewhat protrude from the end face 5d on the rear side.

Consequently, the distal ends of the thin film-like elastic members 9b, 9c and 9d are deposited to the armature 5 in such a fashion as to be crushed by the rotor 4 and the initial transmission torque increases. The deposition sound (attraction sound) occurs when the armature 5 and the rotor 4 come into mutual contact, but the elastic members 9b, 9c and 9d prevent direct collision of the armature 5 and the rotor 4 and reduce the attraction sound.

The inner peripheral edge portion 7b of a plurality of arcuate elongated holes 7a of the plate 7 are positioned more inward in the radial direction than the spring portion 5b of the armature 5 to form the spring portion 7d so that the elastic member 9 is not bonded to the armature side (rear side) of the spring portion 7d of the plate 7. In consequence, the reaction increases and deterioration of the operation factor can be suppressed.

Figure 4:
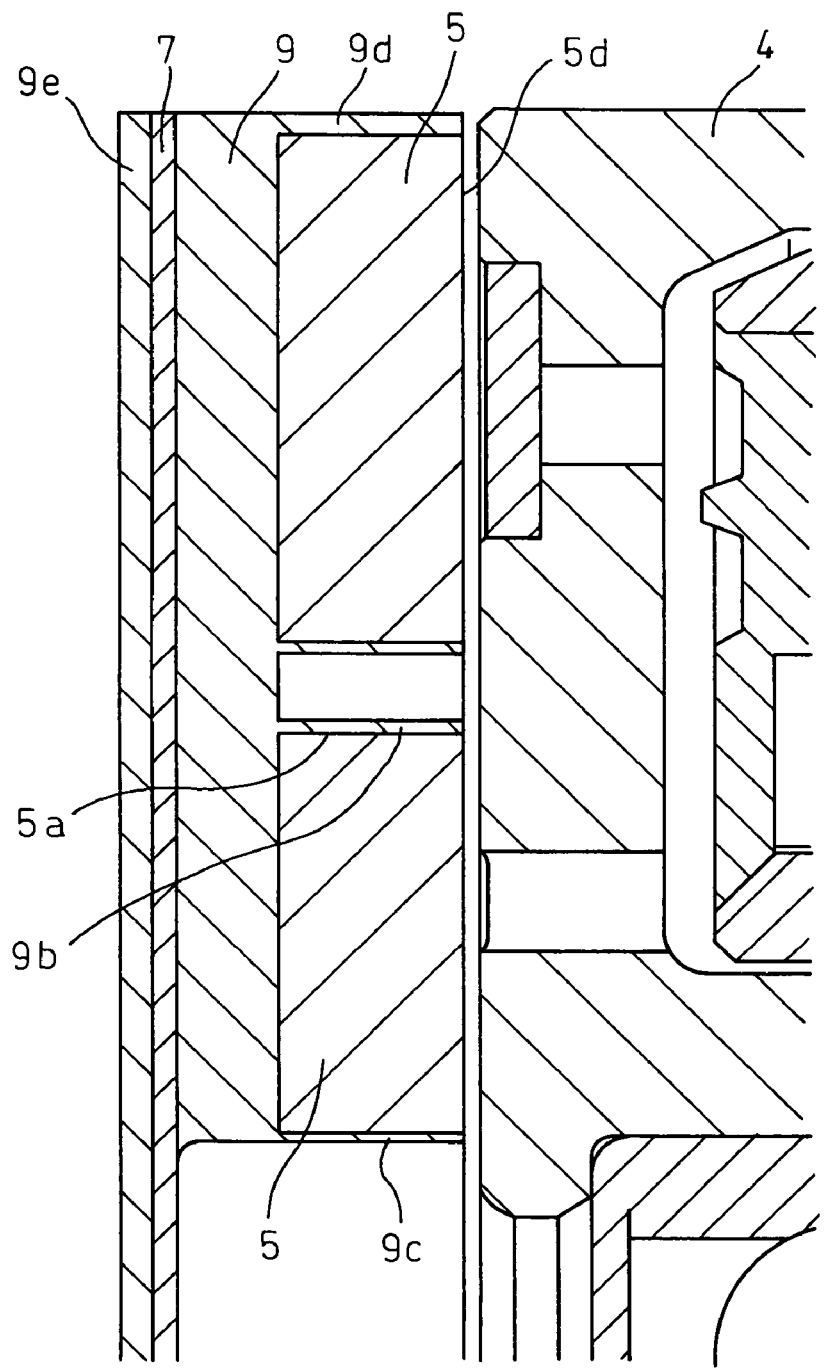
FIG. 4 is a partial enlarged view showing an electromagnetic clutch according to another embodiment of the invention.

FIG. 4 is a partial enlarged view showing another embodiment of the invention. In the foregoing embodiment, the front side of the plate 7 is covered only partially with the elastic member 9. In this embodiment, however, the entire surface of the plate 7 on the front side is covered with the elastic member 9e. After the plate 7 and the armature 5 are vulcanization bonded, the plate 7 and the armature 5 are covered with the elastic member 9e. The rest of the constructions are the same as that of the foregoing embodiment. Consequently, surface treatment of the plate 7 and the armature 5 is not needed.

Figure 5:
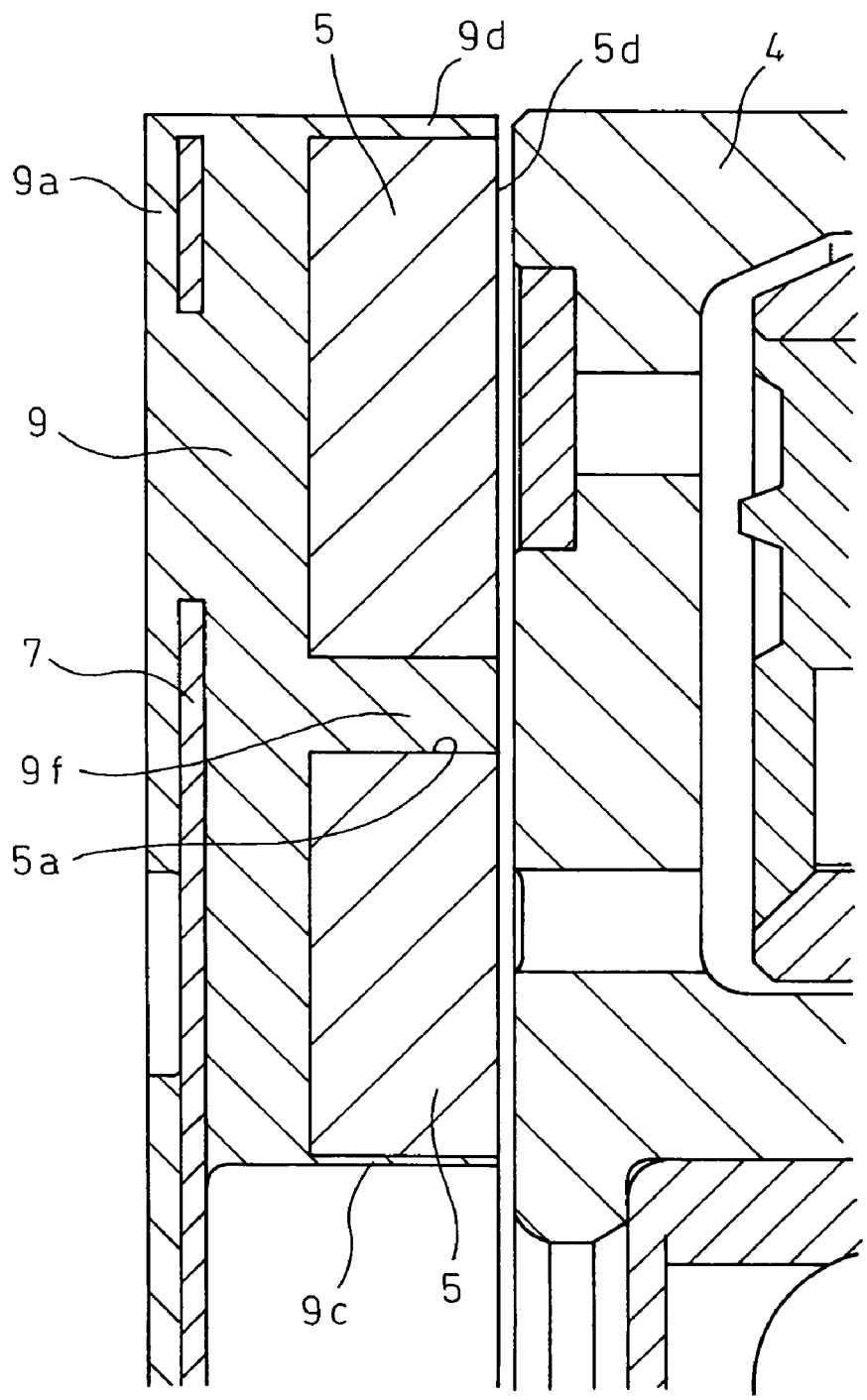
FIG. 5 is a partial enlarged view showing an electromagnetic clutch according to still another embodiment of the invention.

FIG. 5 is a partial enlarged view showing still another embodiment of the invention. In the two foregoing embodiments, the thin film-like elastic member 9b is formed on the inner surface of the elongated holes 5a of the armature 5. In this embodiment, however, the elongated holes 5a of the armature 5 are entirely filled with the elastic member 9f in such a fashion as to expose the elastic member 9f to the friction surface 5d of the armature 5. The rest of the construction is the same as those of the foregoing embodiments. This embodiment exhibits the same effect as the foregoing embodiments.

Figure 6:
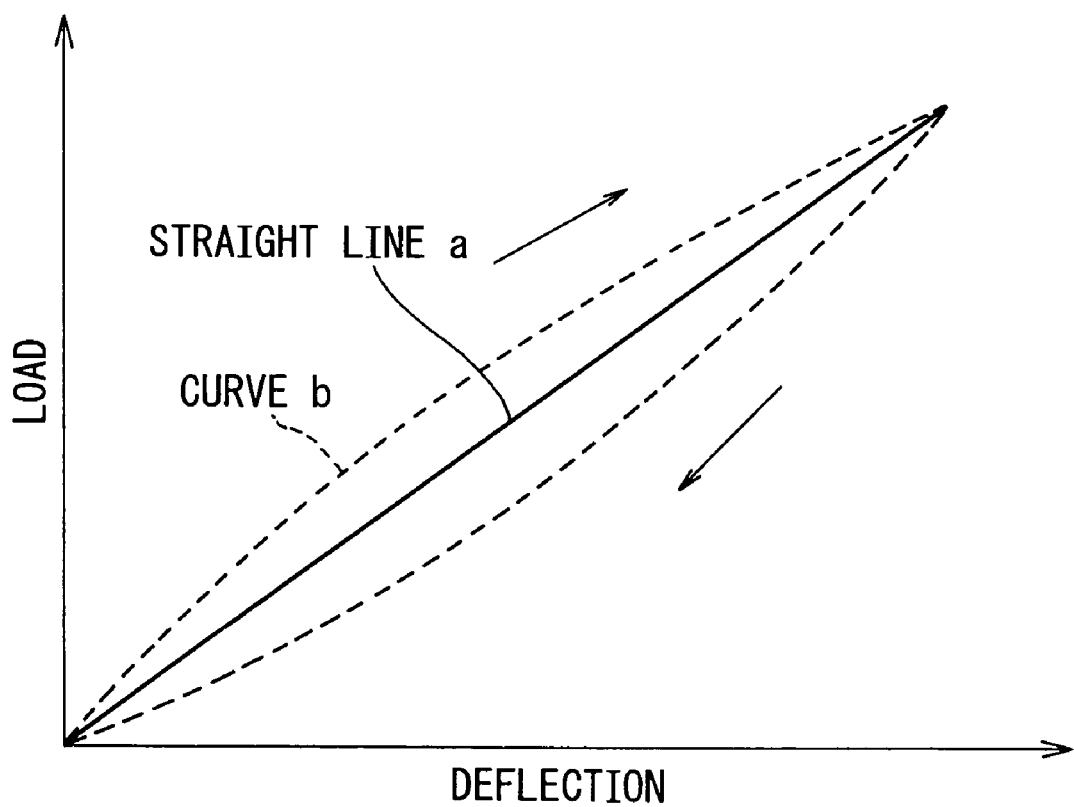
FIG. 6 is a graph comparatively showing spring characteristics in an axial direction in the case where an elastic member is not provided on the front side of a spring portion of a plate and the case where the elastic member is provided.

FIG. 6 comparatively shows the spring characteristics in the axial direction when the elastic member 9 is not disposed on the front side of the spring portion 7d of the plate 7 and when the elastic member 9 is disposed. The ordinate of the graph represents the load and the abscissa represents deflection. It can be understood from FIG. 6 that, when the elastic member 9 is not disposed on the front side of the spring portion 7d of the plate 7, the spring characteristics are represented by a straight line a and when the elastic member 9 is disposed on the front side of the spring portion 7d of the plate 7, the spring characteristics describe a hysteresis curve due to the internal friction of the elastic member as represented by a curve b. The magnitude of the hysteresis represents the degree of contribution of the elastic member 9 to the spring characteristics in the axial direction of the leaf spring, that is, the magnitude of the damping characteristics of the leaf spring. Quite naturally, the damping characteristics of the leaf spring can be improved much more when the degree of contribution of the elastic member 9 is greater.

As described above, in electromagnetic clutches having a hub structure of a leaf spring type, in general, offensive noise occurs due to the vibration of the leaf spring when the electromagnetic clutch is turned OFF from ON. In the invention, however, the elastic member covering the front side of the spring portion of the plate damps the vibration of the spring portion and can suppress the occurrence of the offensive noise.

While the invention has been described by reference to specific embodiments chosen for purposes of illustration, it should be apparent that numerous modifications could be made thereto by those skilled in the art without departing from the basic concept and scope of the invention.

The invention claimed is:

1. An electromagnetic clutch including:
    an electromagnetic coil generating electromagnetic force by the feeding of electric power;
    a driving side rotary member driven and rotated by a driving source;
    an armature attracted to said driving side rotary member by the electromagnetic force generated by said electromagnetic coil and receiving rotation of said driving side rotary member;
    a driven side rotary member interconnected to a rotary shaft of a driven side appliance; and
    a plate connected to said driven side rotary member; said armature and said plate sandwiching an elastic member between them, wherein the plate includes a first portion connecting to the driven side rotary member and a second portion connecting to the armature through said elastic member, wherein said plate includes a spring portion, wherein said elastic member also covers a side of said spring portion of said plate extending from said first portion to said second portion.

2. An electromagnetic clutch according to claim 1, wherein said elastic member covers the side of said plate.

3. An electromagnetic clutch according to claim 1, wherein a plurality of apertures is bored in said plate and an inner peripheral edge portion of each of said apertures is positioned inside an inner diameter of said armature.

4. An electromagnetic clutch according to claim 3, wherein an outer peripheral edge portion of each of said apertures is positioned more outward, in a radial direction, than an inner diameter of said armature.

5. An electromagnetic clutch according to claim 4, wherein said armature is formed into a ring-like shape, wherein said plurality of apertures includes three arcuate elongated holes disposed at regular intervals on an outer periphery portion of said plate.

6. An electromagnetic clutch according to claim 5, wherein said driven side rotary member is connected to said plate through a portion having three sides, wherein each of the three sides faces a space between two of the three arcuate elongated holes, wherein the portion having three sides has a triangular shaped portion when viewed in an axial direction.

7. An electromagnetic clutch according to claim 1, wherein said elastic member is extended to at least the same plane as an end face of said armature on the rear side or to a position somewhat protruding from the end face of said armature on the rear side.

8. An electromagnetic clutch according to claim 7, wherein said elastic member is extended from an elongated hole formed in said armature to the rear side of said armature.

9. An electromagnetic clutch according to claim 7, wherein said elastic member is extended from at least one position, on the outermost or innermost diameter of said armature, towards the rear side of said armature.

* * * * *